March 20, 1934.  M. RESWICK  1,951,771
LUBRICATING DEVICE
Filed Aug. 22, 1930  3 Sheets-Sheet 1
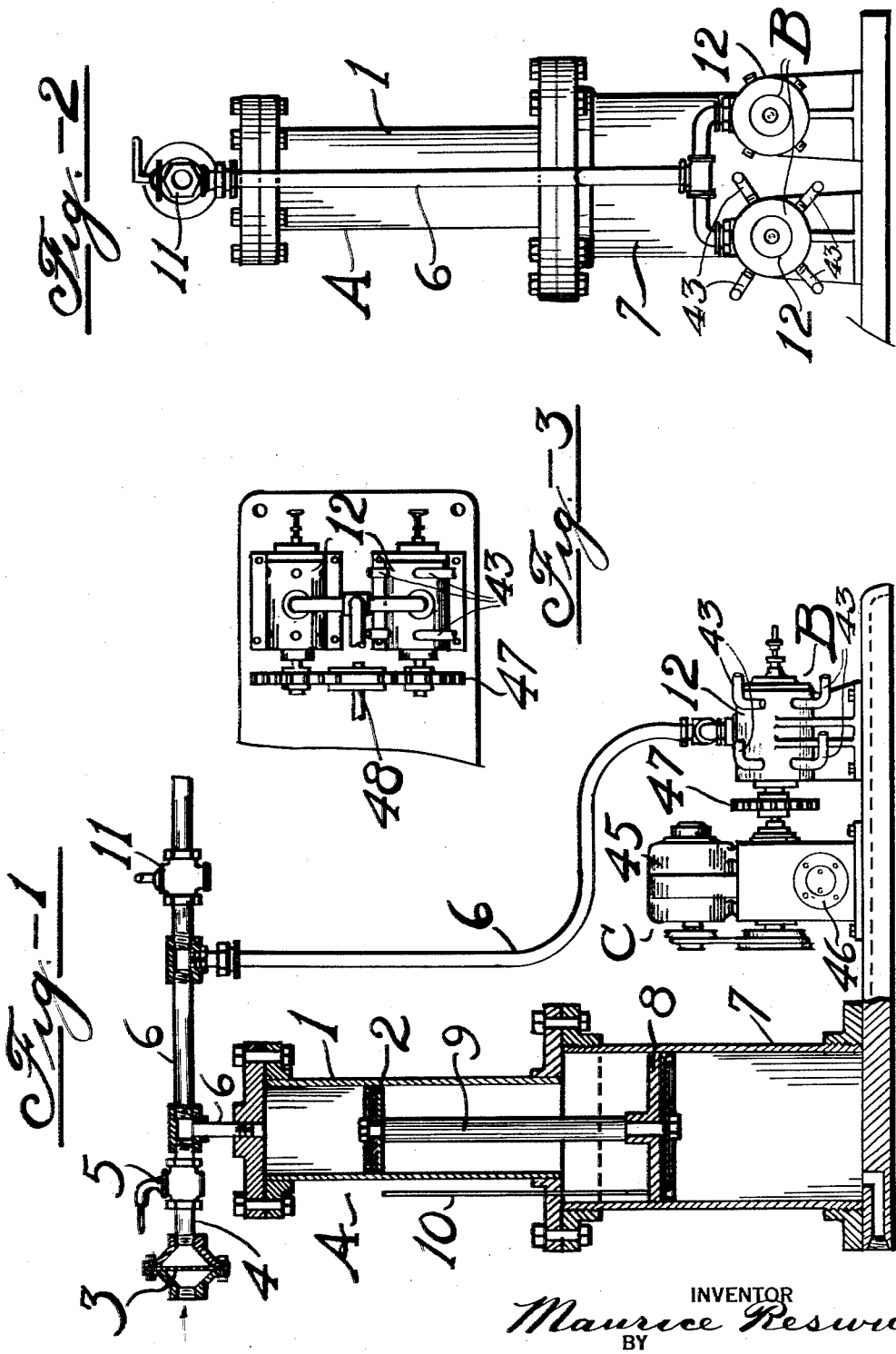

March 20, 1934.  M. RESWICK  1,951,771
LUBRICATING DEVICE
Filed Aug. 22, 1930   3 Sheets-Sheet 2

Maurice Reswick Inventor
W. E. Currie  Attorney

Inventor
Maurice Reswick
By
W. E. Currie, Attorney

Patented Mar. 20, 1934

1,951,771

UNITED STATES PATENT OFFICE 1,951,771

LUBRICATING DEVICE

Maurice Reswick, Dormont, Pa., assignor to Pennsylvania Lubricating Company, a corporation of Delaware Application August 22, 1930, Serial No. 476,976

5 Claims. (Cl. 184—7)

This invention relates to improvements in lubricating systems and is more particularly directed to an improved mechanism for distributing lubricant.

The invention will be fully understood from the following description taken in connection with the accompanying drawings, in which latter Fig. 1 is a side elevation partly in section of the lubricating system;

Fig. 2 is a front elevation of the system;

Fig. 3 is a top plan view of the distributor;

Figure 5:
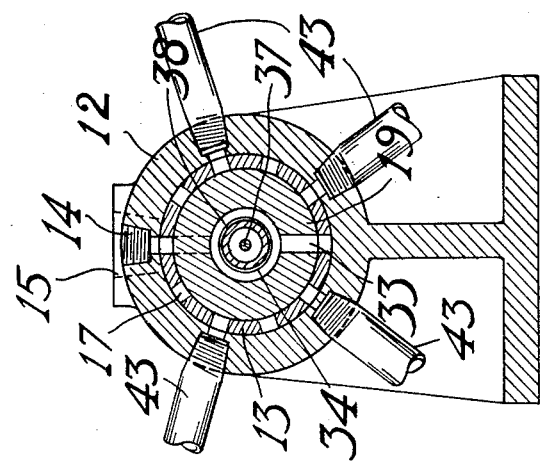
Fig. 5 is a transverse sectional view taken along the line V—V of Fig. 4.

In its broader aspects, the system comprises a compressor "A" for storing lubricant and for feeding it under a predetermined pressure to a distributor "B". The distributor "B" is actuated by a driving mechanism "C" to feed the compressed lubricant at predetermined time intervals through a multiple number of pipe lines in predetermined quantities in a positive manner.

Referring particularly to Figs. 1 and 2 of the drawings, the compressor "A" comprises a cylinder 1 containing a piston 2. Cylinder 1 is adapted to receive lubricant from a source of supply, not shown, through a screen 3, line 4, valve 5 and line 6. Piston 2 is actuated by means of fluid, such as steam or water, to compress the lubricant. The fluid is injected under pressure into a cylinder 7 and actuates a piston 8. Pistons 8 and 2 are connected by a common piston rod 9. A gauge rod 10 is associated with the piston 8 and extends exteriorly of the cylinder 7 to indicate the quantity of lubricant within cylinder 1. The cylinder 7 is of considerably larger diameter than the diameter of cylinder 1. Lubricant is ejected from cylinder 1 under a predetermined pressure through line 6 to one or more distributors "B". In the embodiment illustrated in the drawings two of such distributors are shown. It will be understood that the number can be varied as desired. Lubricant can be by-passed from line 6 through a valve 11.

Figure 4:
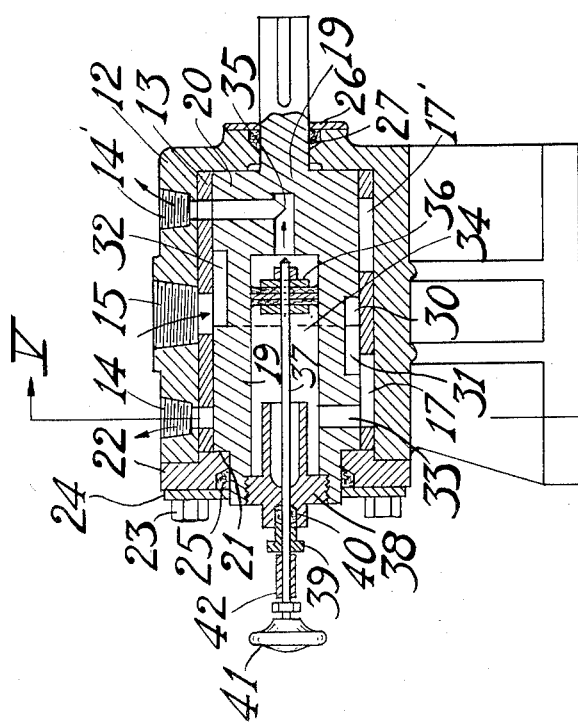
Fig. 4 is a longitudinal sectional view of the distributor.
Figure 6:
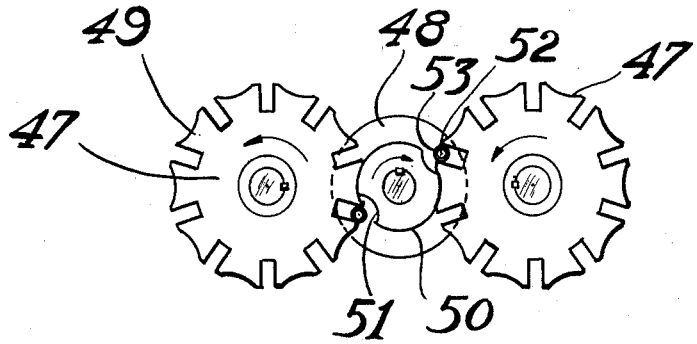
Fig. 6 is a front elevational view of the gears for driving the distributor shown in their initial position.
Figure 8:
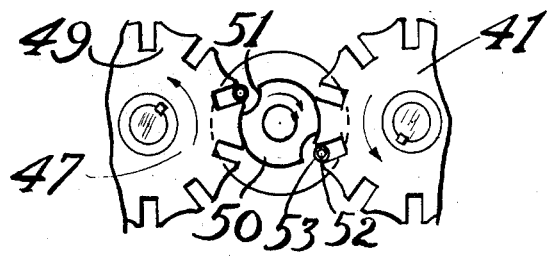
Fig. 8 is a front elevational view of the gears at the completion of one step of the step by step movement.
Figure 7:
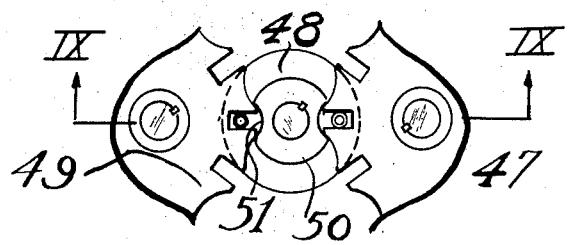
Fig. 7 is a view similar to Fig. 6 showing a second position of the gears.
Figure 9:
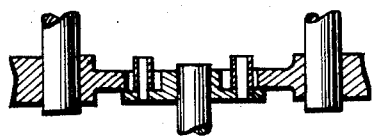
Fig. 9 is a transverse sectional view taken along the line IX—IX of Fig. 7.

As illustrated in Figs. 4 and 5 each distributor comprises a casing 12 into which a bushing 13 is fitted tightly, for example by a shrink or press fit. The casing has longitudinally spaced groups of circumferentially disposed radial outlet ports 14 and 14'. In the preferred embodiment five outlets are disposed in each group, adjoining ports being spaced approximately 72° apart. It will be understood that the number of ports can be varied as desired.

An inlet port 15 in the casing communicates through line 6 with the source of lubricant under pressure. Spaced by-passages 17 and 17' are provided in the casing which are formed by providing slots in the bushing member closed at the outer surface of the bushing by the casing 12. In the embodiment illustrated, there are five by-passages disposed circumferentially of the casing for each group of outlets. The by-passes are preferably spaced approximately 72 circular degrees apart and are situated midway between the outlets of each group.

The casing carries rotatably a cylindrical valve 19 which cooperates with the casing to measure and deliver successive charges of lubricant. The valve is provided with a shoulder 20 which abuts against one end of the casing and is provided with a shoulder 21 at its opposite end which is engaged by a gland 22. The gland is secured to the casing by means of bolts 23 and gland 24. A packing ring 25 is disposed between glands 22 and 24 to prevent the escape of lubricant therebetween. A packing ring 26 and gland 27 prevent the escape of lubricant at the opposite end of the casing.

The valve includes an annular peripheral groove or port 30 which extends around the outer surface of the valve in position to communicate with the inlet port 15 at all positions of rotation of the valve. A slot or laterally extending by-passage 31 in the exterior surface of the valve communicates with the annular port 30 and extends longitudinally of the valve into position to communicate with the channels or by-passages 17 respectively upon rotation of the valve. A similar slot or laterally extending by-passage 32 communicates with the port 30 and extends longitudinally of the cylinder in the opposite direction into position to communicate with the channels or by-passages 17' successively upon rotation of the valve. A port 33 is provided in the cylinder in position to communicate with ports 14 and by-passages 17 respectively upon rotation of the valve. Port 33 communicates with a chamber or bore 34 disposed in the cylinder. A port 35 leads from the bore and opens upon the exterior of the cylinder in position to communicate respectively with the ports 14' and by-passages 17' upon rotation of the valve. The by-passages 17 extend into the transverse plane of the ports 14 and 33 and by-passage 31. The by-passages 17' extend into the transverse plane of the ports 14' and 35 and by-passage 32. A piston 36 is mounted for reciprocating movement in the bore between the ports 33 and 35 and is adapted to be actuated by the pressure of the lubricant supplied through the openings. The port 33 lies in a common transverse plane with the group of outlet ports 14. The port 35 lies in a common transverse plan with the group of outlet ports 41. A piston rod 37 extends through the glands 38 and 39 and packing 40 exteriorly of the cylinder valve and terminates in a handle 41. The length of stroke of the piston is regulated by means of a sleeve 42 associated with the piston rod. In the position shown in Fig. 4, lubricant under pressure injected through inlet port 15 flows through the peripheral port 30, by-passage 31, by-passage 17 and port 33 into the bore 34 where it actuates the piston to the right. The piston forces the lubricant in bore 34 outwardly through valve port 35 and casing port 14' into the pipe lines 43 which may lead to bearings to be lubricated. The valve is maintained in this position of rotation sufficiently long for the piston to complete its stroke. Upon the next step of rotation of the valve, the by-passage 32 is brought into communication with a by-passage 17' and the by-passage 31 is withdrawn from communication with any of the by-passages 17. The lubricant under pressure is now fed from by-passage 32 through by-passage 17' and port 35 into the bore 34. The lubricant actuates the piston in the reverse direction thereby forcing lubricant ahead of the piston through port 33 and discharge port 14. Reciprocation of the piston can be observed by watching the handle 41 and in case of sluggishness of movement of the piston, the latter can be actuated manually by means of the handle 41.

The valve of each distributor is driven in step by step rotation from a motor 45 operating through a speed reducer 46 and intermittent-motion gears 47 and pinion 48. The gears and pinion are shown in detail in Figs. 6-9 inclusive. The intermittent-motion gear 47 is affixed non-rotatably to the valve. The gear is provided with teeth 49, the ends of which are concave transversely.

The drive pinion 48 is provided with a cylindrical portion 50 having a radius substantially equal to the radius of the concavity of each tooth. The cylindrical portion nests in the concave portion of the teeth successively and functions to hold the gears 47 stationary between the step by step movement of the gears. The cylindrical portion is provided with oppositely disposed recesses 51 to permit freedom of rotation between the drive pinion and the gears. Pins 52 are carried by the pinion opposite the recesses and are provided with rolls 53 which are adapted to mesh with the slots between the gear teeth and drive the gears in step by step rotation.

By the construction described, numerous parts of machinery can be lubricated automatically from a central distributor agency. Oil or grease of varying consistency can be used. In the preferred embodiment, the lubricating system is actuated by the power which actuates the machinery, and the lubricating system and machinery are deactivated at the same time. The flow of lubricant therefore ceases when the machinery is stopped. The lubricant is delivered from a central container through a multiple number of pipe lines in a positive manner in predetermined quantities and at regular time intervals. The device is simple and compact in construction. While the invention has been described as applied to the distribution of lubricant, it will be understood that other fluids can be similarly distributed.

Various changes may be made within the scope of the appended claims, in which it is desired to claim all novelty inherent in the invention as broadly as the prior art permits.

I claim:

1. Apparatus for distributing lubricant, comprising a casing, radial discharge ports in the casing, a valve rotatable in the casing, radial ports in the valve adapted to register successively with the casing ports, a bore in the valve terminating in the valve ports, a piston adapted to reciprocate in the bore, an annular peripheral port in the valve, an inlet port in the casing for supplying lubricant under pressure to the annular port, and means operative on rotation of the valve for alternately and successively establishing communication between the annular port and the ends of the bore while communication is simultaneously established between the opposite end of the bore and one of the radial discharge ports so that lubricant entering the inlet operates the piston to discharge the lubricant through the casing ports.

2. Apparatus for distributing lubricant, comprising a casing, two spaced series of radial discharge ports disposed in the casing, a valve rotatable in the casing, radial ports spaced longitudinally in the valve each positioned to register successively with its series of casing ports, a bore in the valve terminating in the valve ports, a piston adapted to reciprocate in the bore, an annular peripheral port in the valve, an inlet port in the casing for supplying lubricant under pressure to the annular port, and means operative on rotation of the valve for alternately and successively establishing communication between the annular port and the ends of the bore while communication is simultaneously established between the opposite end of the bore and one of the radial discharge ports so that lubricant entering the inlet operates the piston to discharge the lubricant through the casing ports.

3. Apparatus for distributing lubricant, comprising a casing, two spaced series of radial discharge ports disposed in the casing, a valve rotatable in the casing, radial ports spaced longitudinally in the valve each positioned to register successively with its series of casing ports, a bore in the valve terminating in the valve ports, a piston adapted to reciprocate in the bore, an inlet port in the casing disposed between the two series of radial discharge ports, an annular peripheral valve port in a common transverse plane with the inlet port, and means operative on rotation of the valve for alternately and successively establishing communication between the annular port and the ends of the bore while communication is simultaneously established between the opposite end of the bore and one of the radial discharge ports so that lubricant entering the inlet operates the piston to discharge the lubricant through the casing ports.

4. Apparatus for distributing lubricant, comprising a casing, radial discharge ports in the casing, a valve rotatable in the casing, radial ports in the valve adapted to register successively with the casing ports, a bore in the valve terminating in the valve ports, a piston adapted to reciprocate in the bore, an inlet port in the casing, an annular peripheral valve port in a common transverse plane with the inlet port, valve by-passages extending laterally from the annular port and opening through the periphery of the valve, casing by-passages opening through the inner face of the casing in the transverse plane of the ports and the openings of the valve by-passages so that upon rotation of the valve communication is alternately and successively established between the annular port and the ends of the bore while communication is simultaneously established between the opposite end of the bore and one of the radial discharge ports whereby lubricant entering the inlet operates the piston to discharge the lubricant through the casing ports.

5. Apparatus for distributing lubricant, comprising a casing, two spaced series of radial discharge ports disposed in the casing, a valve rotatable in the casing, radial ports spaced longitudinally in the valve each positioned to register successively with its series of casing ports, a bore in the valve terminating in the valve ports, a piston adapted to reciprocate in the bore, an inlet port in the casing between the two series of discharge ports, an annular peripheral valve port in a common transverse plane with the inlet port, valve by-passages extending in opposite directions laterally from the annular port and opening through the periphery of the valve, casing by-passages extending toward each other opening through the inner face of the casing in the transverse plane of the ports and the openings of the valve by-passages so that upon rotation of the valve communication is alternately and successively established between the annular port and the ends of the bore while communication is simultaneously established between the opposite end of the bore and one of the radial discharge ports so that lubricant entering the inlet operates the piston to discharge the lubricant through the casing ports.

MAURICE RESWICK.